Figure 1:
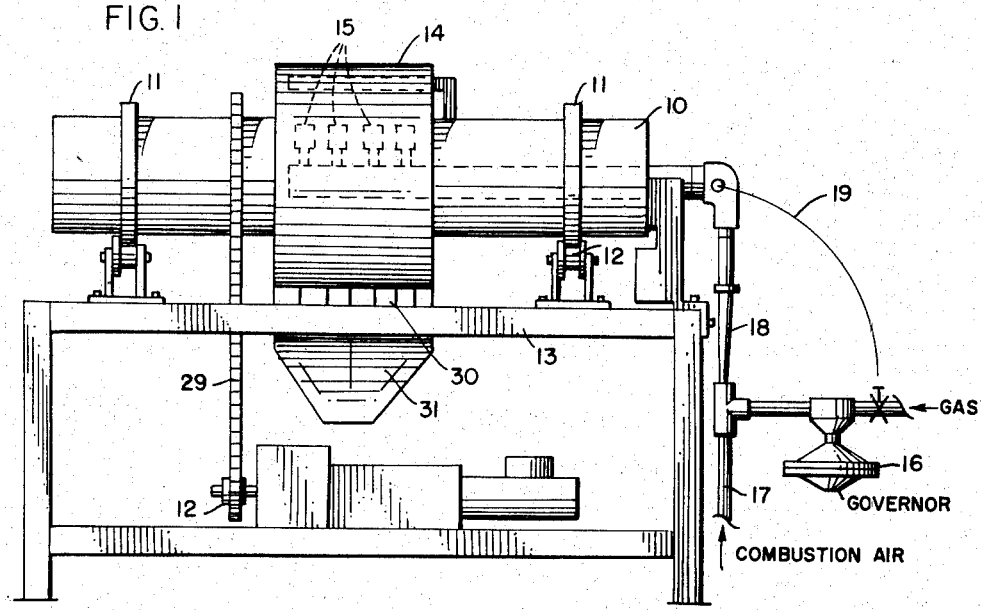

Jan. 2, 1968   J. W. HUDSON ETAL   3,361,187
CONCENTRATION OF WET PROCESS PHOSPHORIC ACID
Filed Dec. 17, 1964   3 Sheets-Sheet 1

INVENTORS:
JOHN W. HUDSON
JOHN D. NICKERSON
BY Carl C. Batz
ATT'Y

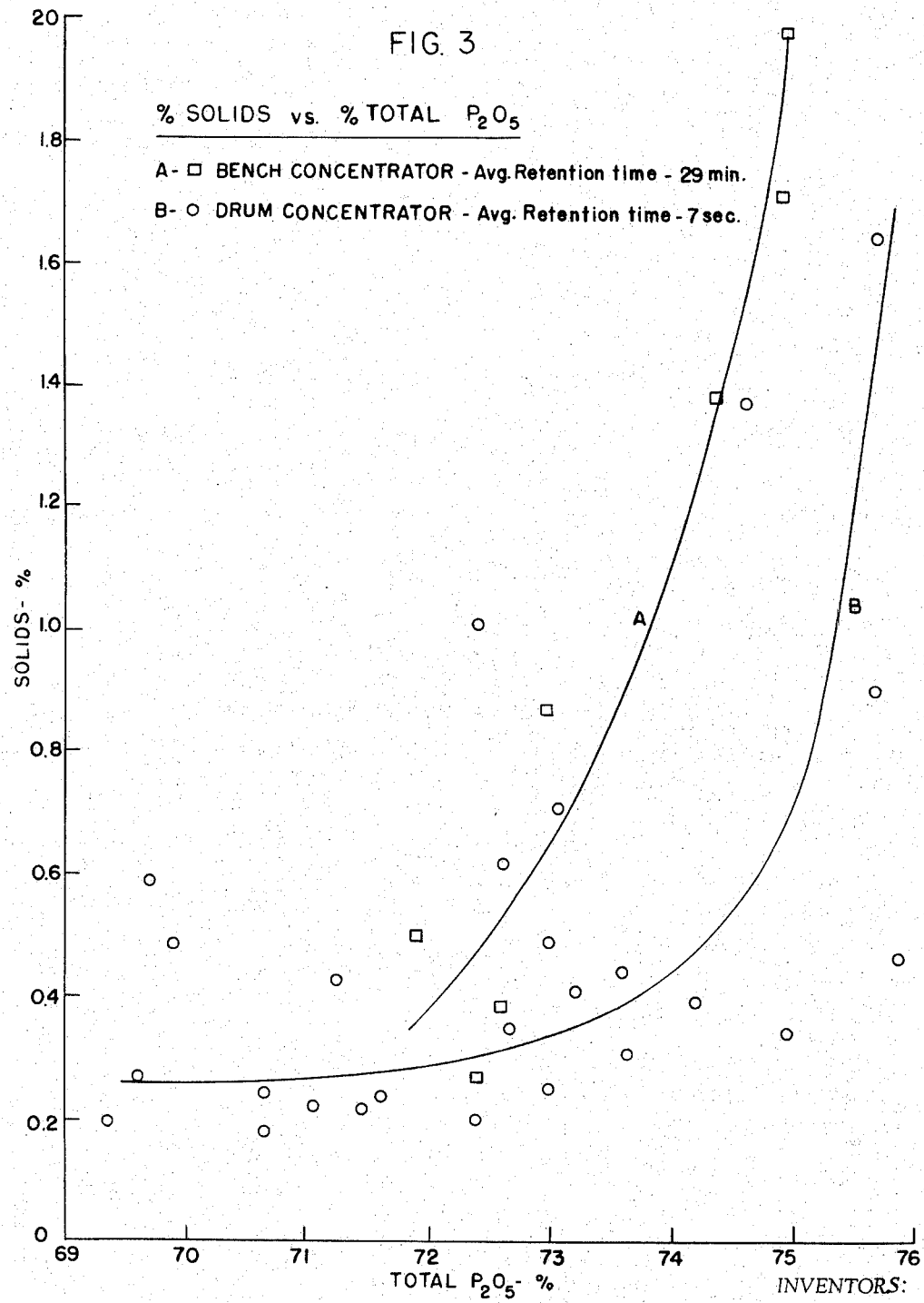

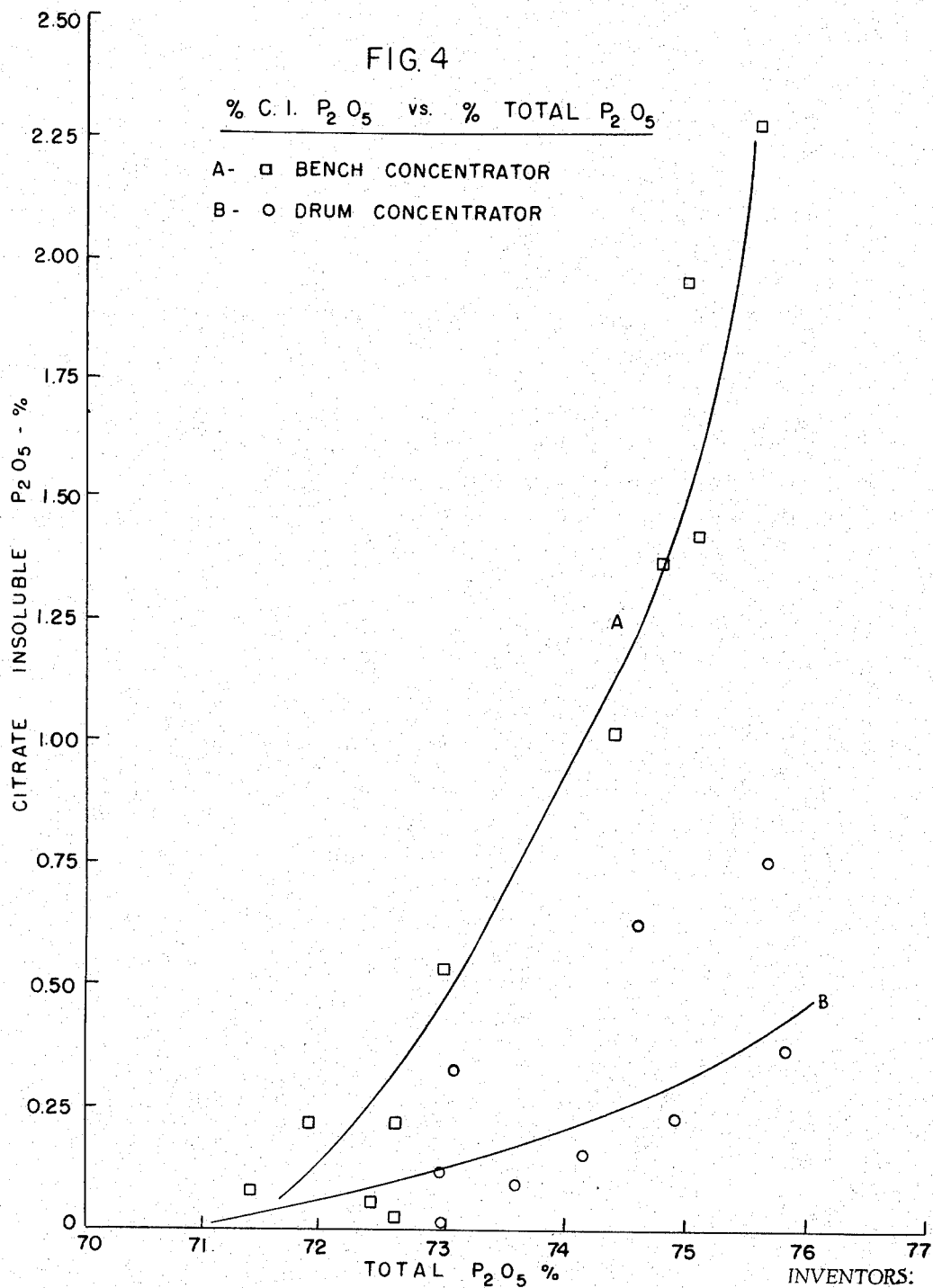

United States Patent Office 3,361,187
Patented Jan. 2, 1968

3,361,187
CONCENTRATION OF WET PROCESS
PHOSPHORIC ACID
John W. Hudson and John D. Nickerson, Atlanta, Ga.,
assignors, by mesne assignments, to Armour Agricultural Chemical Company, a corporation of Delaware
Filed Dec. 17, 1964, Ser. No. 419,027
3 Claims. (Cl. 159—49)

This invention relates to the concentration of wet process phosphoric acid, and more particularly to a concentration process to produce a wet process superphosphoric acid low in solids content.

In some of the present-day processes for concentrating wet process phosphoric acid, the acid is heated in a liquid body by introducing hot combustion gases through a dip pipe into the body of liquid acid or otherwise heating the liquid acid to remove water. Such processes for the concentration of wet process phosphoric acid, of approximately 54 percent $P_2O_5$, to superphosphoric acid at 70 and above percent $P_2O_5$, result in the formation of undesirable solids. These solids consist primarily of iron and aluminum polyphosphate with minor quantities of gypsum. The iron and aluminum polyphosphates formed contain as much as 75 percent $P_2O_5$ which is found not to be agronomically available as plant food.

Wet process phosphoric acid containing 54 percent $P_2O_5$ normally contains a quantity of solids which are of a different chemical nature than those solids formed at concentrations of 70 and above percent $P_2O_5$. In fact, the solids present in the 54 percent $P_2O_5$ acid largely dissolve during the concentration step to 70 and above percent $P_2O_5$.

The two principal reasons for the formation of undesirable solids above 70 percent $P_2O_5$, other than the presence of impurities in the first place, in the present-day concentration processes are:
 (1) Localized overheating of the acid, and
 (2) Relatively long exposure times at the temperatures necessary for concentration.

We have discovered a process for concentrating ordinary wet process phosphoric acid which avoids the above objections, obviating localized overheating of the acid and providing a controlled, very short exposure time or actual retention time.

A primary object, therefore, is to provide a process for acid concentration which allows an extremely short exposure time and with a minimum danger of localized overheating. A further object is to provide a process whereby wet process phosphoric acid is exposed for an extremely short exposure time to a selected temperature for concentration of the acid so that the acid is subjected not to an average retention time but to an actual retention time measured in seconds. A further object is to concentrate wet process phosphoric acid by evaporation of water from a film of acid uniformly distributed over the external surface of a rotating drum which is heated internally, thus providing a high evaporation surface to acid volume ratio. Other specific objects and advantages will appear as the specification proceeds.

In one embodiment of our invention, a drum concentrator is employed, the concentrator consisting of a revolving metal cylinder mounted on a trunnion supported by rings and rollers upon a structural steel frame. The heat on the outer surface of the drum is provided by a gas burner situated inside the cylinder. In this way, direct contact of flame and acid is avoided while an even heat is transferred through the cylinder wall to the outer surface. The acid is applied to the outer surface so that it is heated without localized overheating and is concentrated to the desired superphosphoric acid level.

Figure 2:
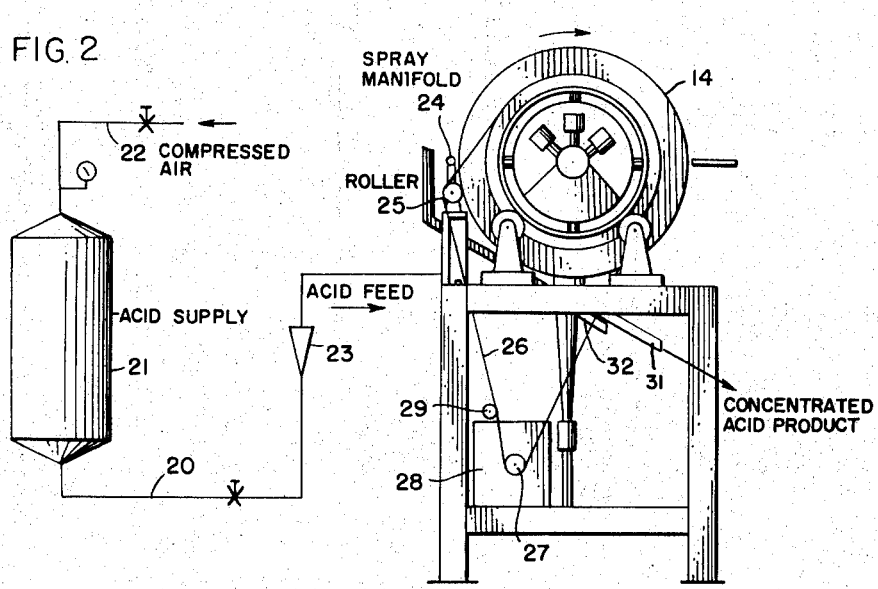

The invention may be practiced in any suitable drum concentrator and, for the purpose of illustration, a suitable drum concentrator is shown in the accompanying drawing, in which:

FIG. 1 is a side view in elevation of a drum concentrator which may be employed in the practice of our invention;

FIG. 2, an end view in elevation; and

FIGS. 3 and 4, charts showing comparative results obtained by the drum concentrator process and those obtained by a bench concentrator designed to concentrate the acid in a liquid body.

In the illustration given in FIGS. 1 and 2, a hollow trunnion 10 is supported by trunnion rings 11 on rollers 12 supported upon the base frame 13. Fixedly mounted on the trunnion 10 and communicating with the interior of the trunnion is a concentrator drum 14 which is preferably formed of corrosion-resistant materials, such as Carpenter 20, Nionel alloy, other stainless steel materials. The drum is heated interiorly by a gas burner in which a gas-air mixture is burned in three banks of four blast burner tips 15. Gas is supplied at 15 oz./sq. in to the zero gas governor 16. Combustion air is supplied through pipe 17 to an aspirator-mixer 18 at 2–8 oz./sq. in. depending upon the heat requirements. The gas is mixed with air and maintained at a constant ratio by the zero gas governor and the manifold feed back 19. The three banks of four blast burner tips 15 are arranged to distribute the heat evenly over the interior of the revolving drum under the concentration area.

The wet process phosphoric feed acid is delivered to feed pipe 20 from an acid reservoir feed tank 21 by compressed air pressure in line 22, and the rate of acid feed is measured by a rotameter 23 and is regulated by a needle valve. The feed acid is applied to the external surface of the concentrator drum 14 through a manifold 24 which extends across the face of the drum and is provided with apertures through which the acid is discharged uniformly upon the face of the drum. Below the manifold 24 is mounted a roller 25 which is supported for rotation and which is driven by means of a chain 26 which engages a sprocket 27 mounted upon the drive shaft of a motor 28. Slack in the chain is taken up by a chain idler 29. The chain 26 not only drives the roller 25 but also the trunnion 10 so that the applicator roller is driven in the same direction as the concentrator drum, with the result that the proximal surfaces of the roller and drum are moving in opposite directions to each other. The applicator roller assists in applying the acid as a continuous film on the drum.

As shown best in FIG. 2, the feed acid is applied in a thin film on the drum surface at one side of the apparatus, and water is evaporated as the heated drum revolves. The concentrated acid is scraped from the drum by the drum scraper 30 and runs down the product discharge chute 31. Any acid feeding back from the applicator roller or which is not scraped from the drum may be discharged through the recycle chute 32.

In the operation of the apparatus, the acid concentration may be varied and controlled by the temperature of the drum surface, which may be measured by a thermocouple in contact with the drum surface, or by the drum speed, or by the feed rate of dilute acid. With the equipment shown, it is possible, with an acid film, to reach surface temperatures which are relatively high, such as 600° F., but we prefer to employ temperatures recorded in the neighborhood of 350° to 500° F.

By employing relatively low temperatures, such as the recorded temperatures of 350° to 500° F., and by rotating the drum so as to give relatively short retention time, such as 5 to 15 seconds, we find that the phosphoric acid can be concentrated to about 70 to 77 and above percent $P_2O_5$ phosphoric acid. As a result of our procedure, the solids content can be reduced by 10 to 200 percent, depending upon the level of concentration, relative to other procedures previously mentioned.

As a result of the foregoing, the process provides an extremely short exposure time measured in seconds, the retention time being the actual retention time for each portion of the acid and being determined by the travel of the acid after deposition upon the drum over the heated dehydration portion of the drum to the discharge point in contact with the scraper blades 30. Such short retention time, together with the use of the uniformly-heated cylinder, eliminates local overheating. Finally, there is a minimum of $P_2O_5$ entrainment losses since combustion gases are not employed, and the acid is heated in a thin layer or film on the indirectly-heated exterior surface of the drum.

We prefer to maintain a retention time of less than 15 seconds. Best results are obtained at even lesser times of 10 seconds or 5 seconds or less.

Specific examples illustrative of the process may be set out as follows:

EXAMPLE I

A feed acid containing 57.23 weight percent $P_2O_5$ and 1.21 percent solids was fed to the drum concentrator shown in FIGS. 1 and 2 at a constant rate. By varying the temperature between 350° and 500° F., the results given in Table I were obtained.

TABLE I.—CONCENTRATION OF 57.23% $P_2O_5$ ACID

| Recorded Temp., °F. | Retention Time, Sec. | Percent Total $P_2O_5$ | Percent Solids [1] |
|---|---|---|---|
| 350 | 6.8 | 63.16 | 0.27 |
| 400 | 6.8 | 64.43 | 0.27 |
| 480–500 | 6.8 | 74.92 | 0.42 |
| 480–500 | 5.1 | 74.56 | 0.31 |

[1] Concentrated acid diluted to 39% $P_2O_5$, filtered and weight of solids determined; percent based on weight of concentrated acid.

The above table illustrates the ability of the drum concentrator to concentrate wet process phosphoric acid to superphosphoric acid levels containing a negligible amount of solids.

EXAMPLE II

The same feed acid used in Example I was fed to the concentrator shown in FIGS. 1 and 2 at a constant rate while the recorded temperature was maintained at plus or minus 5° F. of setting. Samples were drawn at successive time intervals and analyzed. The results are given in Table II.

TABLE II.—CONSISTENCY OF ACID CONCENTRATION

| Temp., °F. | Retention Time, Sec. | Elapsed Time of Operation, Min. | Percent Total $P_2O_5$ | Percent Solids |
|---|---|---|---|---|
| 380–390 | 13 | 15 | 72.81 | 0.31 |
| 380–390 | 13 | 30 | 73.10 | 0.29 |
| 380–390 | 13 | 40 | 73.52 | 0.34 |
| 410–420 | 6.8 | 10 | 71.54 | 0.30 |
| 410–420 | 6.8 | 20 | 71.39 | 0.28 |

Table II illustrates the consistency of concentration obtained from the drum concentrator and shows that operating conditions can be easily controlled to produce superphosphoric acid of consistent analysis.

EXAMPLE III

An extended test was made to investigate the effect of the retention time and temperature variables on concentration and solids formation. Tests were made as described in Example I on a wet process phosphoric acid feed which analyzed 54.51 percent $P_2O_5$ with 1.03 percent solids. The results are set out in Table III.

TABLE III.—DRUM CONCENTRATOR RUNS ON WET PROCESS ACID RETENTION TIME AND TEMPERATURE VARIABLES

| | Retention Time, Sec. | Percent Total $P_2O_5$ | Percent Solids | Percent Citrate Insolubles $P_2O_5$ |
|---|---|---|---|---|
| Feed 150 g./min.: | | | | |
| 400° F | 9 | 71.03 | 0.23 | 0.08 |
| | 7 | 72.68 | 0.35 | 0.08 |
| | 5 | 70.65 | 0.18 | 0.12 |
| 450° F | 9 | 72.99 | 0.25 | 0.07 |
| | 7 | 73.59 | 0.44 | 0.11 |
| | 5 | 72.99 | 0.49 | 0.14 |
| 500° F | 9 | 75.86 | 0.46 | 0.38 |
| | 7 | 74.62 | 1.37 | 0.64 |
| | 5 | 75.69 | 1.60 | 0.76 |
| 400° F | 9 | 69.62 | 0.27 | 0.09 |
| | 7 | 68.40 | 0.23 | 0.10 |
| | 5 | 69.34 | 0.20 | 0.30 |
| 450° F | 9 | 72.39 | 0.20 | 0.09 |
| | 7 | 71.44 | 0.22 | 0.10 |
| | 5 | 70.64 | 0.25 | 0.09 |
| 500° F | 9 | 71.59 | 0.24 | 0.05 |
| | 7 | 73.23 | 0.41 | 0.05 |
| | 5 | 72.43 | 1.04 | 0.06 |
| Feed 250 g./min.: | | | | |
| 400° F | 9 | 69.89 | 0.49 | 0.06 |
| | 7 | 69.71 | 0.59 | 0.15 |
| | 5 | 71.25 | 0.43 | 0.20 |
| 450° F | 9 | 74.18 | 0.39 | 0.15 |
| | 7 | 73.62 | 0.36 | 0.11 |
| | 5 | 72.62 | 0.62 | 0.12 |
| 500° F | 9 | 74.93 | 0.34 | 0.24 |
| | 7 | 75.70 | 0.90 | 0.08 |
| | 5 | 73.08 | 0.71 | 0.34 |

EXAMPLE IV

The same acid, treated in Example III, was concentrated in a laboratory scale continuous evaporator. This evaporator consists simply of a metal vessel into which the liquid phosphoric acid is introduced and the vessel is then heated externally by a gas burner to bring about concentration, the dilute 54 percent $P_2O_5$ phosphoric acid being continuously introduced into the vessel and the concentrated acid being received as overflow. The principle of the operation is substantially that of submerged gas type concentration except that instead of using combustion gases to heat the feed, an external gas burner is the heating means employed. The results of concentrating the acid in the laboratory scale continuous evaporator are set out in Table IV.

TABLE IV.—LABORATORY BENCH CONTINUOUS CONCENTRATION OF ACID 126-43-3

| Temp., °F. | Retention Time, Min. | Percent Total $P_2O_5$ | Percent Citrate Insolubles $P_2O_5$ | Percent Solids |
|---|---|---|---|---|
| 570 | 20 | 71.9 | 0.21 | 0.50 |
| 586 | 14 | 72.4 | 0.06 | 0.27 |
| 611 | 20 | 72.6 | 0.21 | 0.38 |
| 628 | 20 | 73.0 | 0.54 | 0.87 |
| 677 | 26 | 74.4 | 1.01 | 1.38 |
| 679 | 25 | 74.8 | 1.38 | 1.76 |
| 719 | 30 | 75.0 | 1.97 | 2.13 |
| 738 | 30 | 76.1 | 1.43 | 3.62 |
| 778 | 30 | 76.6 | 2.28 | 4.11 |

From the data in Tables III and IV, it should be noted that the temperatures in the laboratory continuous concentrator are very much higher than those recorded on the drum concentrator for equivalent $P_2O_5$ concentrations. The temperatures are comparable to those used in the submerged gas-type concentrator where the retention time is in the range of 1 to 5 minutes.

FIG. 3 of the drawings summarizes the results of Tables III and IV for the variation of solids with $P_2O_5$ concentration. The graph indicates that below 73 percent $P_2O_5$ for this acid, the percent solids are approximately equivalent at 0.6 to 0.3 percent. A significant trend begins above 73 percent to give lower solids using the drum concentrator. These limits, of course, will vary from acid to acid and no absolute figures are to be inferred from the drawing.

In the records shown in Tables III and IV the percents of citrate insoluble (percent citrate insolubles) $P_2O_5$ ("Official Methods of Analysis," AOAC, page 11, paragraph 2,030, ninth edition, 1960) are shown both for the drum concentrator runs and the laboratory bench continuous runs. FIG. 4 shows a plot of the data. These data illustrate the quantities of $P_2O_5$ which are lost as available plant food if solids have cause to form during the concentration to superphosphoric acid and clearly illustrate that significant quantities of plant food $P_2O_5$ can be retained over present processes by the practice of our invention.

While in the foregoing specification we have described an embodiment of the invention in considerable detail for the purpose of illustrating the invention, it will be understood that such detail or details may be varied widely by those skilled in the art without departing from the spirit of our invention.

We claim:
1. In a process for concentrating wet process orthophosphoric feed acid containing solids and iron and aluminum impurities to reduce the solids content thereof, the steps of continuously rotating a metal drum, heating the drum on the interior thereof to raise the temperature of the exterior surface thereof to a dehydrating temperature in the range of about 350–600° F. while applying to said exterior surface as it rotates said wet process orthophosphoric acid to concentrate said acid to a $P_2O_5$ content in excess of 70 percent, and removing the concentrated acid as product from said drum.

2. The process of claim 1 in which the retention time of the acid film on the drum exterior surface is less than 15 seconds.

3. The process of claim 1 in which the applied feed acid is rolled against the exterior drum surface.

References Cited

UNITED STATES PATENTS

| | | | |
|---|---|---|---|
| 642,620 | 2/1900 | Mather | 159—11 |
| 654,470 | 7/1900 | Mather | 159—12 |
| 2,806,000 | 9/1957 | Streicher | 23—165 X |
| 2,817,155 | 12/1957 | Gilliam et al. | 34—8 |
| 2,817,156 | 12/1957 | Gilliam | 34—39 |
| 3,134,644 | 5/1964 | Shaffery et al. | 23—165 |

OTHER REFERENCES

"Elements of Chemical Engineering," Badger, W. L. and McCabe, W. L., McGraw-Hill Book Co., New York (1936), pp. 293–296.

"Combustion Engineering," 1st ed., de Lorenzi, Otto Superheater, Inc., New York (1951), pp. 28/8, 28/9, 28/23–24.

"Industrial Chemistry," 3rd ed., Riegel, E. R. Reinhold Publishing Co. (1937), p. 359.

"Chemical Engineering Plant Design," 3rd ed., Vilbrandt, Frank C., McGraw-Hill Book Co., New York (1949), pp. 354–360.

"Introduction to Chemical Engineering," Badger and Banchero (1955), p. 478.

NORMAN YUDKOFF, *Primary Examiner.*

J. SOFER, *Assistant Examiner.*